(12) United States Patent
Shinso et al.

(10) Patent No.: US 6,723,014 B2
(45) Date of Patent: Apr. 20, 2004

(54) CONTROL DEVICE OF CONTINUOUSLY VARIABLE TRANSMISSION

(75) Inventors: Yoshihide Shinso, Fuji (JP); Yoshikazu Miyagawa, Fuji (JP); Satoshi Sakakibara, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/810,608

(22) Filed: Mar. 20, 2001

(65) Prior Publication Data

US 2001/0027147 A1 Oct. 4, 2001

(30) Foreign Application Priority Data

Mar. 21, 2000 (JP) .................................... 2000-078652

(51) Int. Cl.[7] .............................................. F16H 61/06
(52) U.S. Cl. ........................................ 474/20; 474/18
(58) Field of Search ...................................... 474/18, 20

(56) References Cited

U.S. PATENT DOCUMENTS 4,509,125 A * 4/1985 Fattic et al. ................. 474/18
5,334,102 A * 8/1994 Sato .......................... 474/18
5,961,408 A * 10/1999 Konig et al. ................. 474/18
5,971,876 A * 10/1999 Spiess et al. ................ 474/18

\* cited by examiner

Primary Examiner—Robert A. Siconolfi
(74) Attorney, Agent, or Firm—Rossi & Associates

(57) ABSTRACT

A transmission mechanism of continuously variable transmission in a vehicle comprises a primary pulley and a secondary pulley provided with a first cylinder chamber and a second cylinder chamber, with groove widths being changed by supply of hydraulic pressure, and a belt provided between the pulleys. A hydraulic pressure to the first cylinder chamber is controlled by CVT control unit through a shift control valve according to a driving state of the vehicle, and the second cylinder chamber is continuously supplied with a line pressure. CVT control unit includes an internal memory to retain a heavy-current system fail flag according to the failure information inputted from a motor control unit. If, at start of driving, the internal memory holds failure information indicating that the electric motor driving a hydraulic pump fails in previous driving, CVT control unit outputs a shift command targeting a high range ratio for a predetermined time to thereby fill the first cylinder chamber with hydraulic pressure, and thereafter outputs a shift command targeting a normal gear ratio according to the driving state.

2 Claims, 5 Drawing Sheets

CONTROL DEVICE OF CONTINUOUSLY VARIABLE TRANSMISSION

BACKGROUND OF THE INVENTION

1. Field of the Invention

The present invention generally relates to a continuously variable transmission with a V-belt for use in vehicles, etc., and more particularly to an improvement in shift control of the continuously variable transmission.

2. Description of the Prior Art

In recent years, there has been developed a so-called hybrid vehicle, which is a combination of an internal combustion engine (hereinafter referred to as an engine) and an electric motor, in order to protect the environment and improve the fuel economy. Accordingly, a combination of this hybrid vehicle and a V-belt type continuously variable transmission has been proposed.

In the V-belt type continuously variable transmission, a V-belt passes about a primary pulley and a secondary pulley, both of which are variable pulleys. The groove width of the primary pulley is variably controlled by the supply of hydraulic pressure.

More specifically, as shown in FIG. 5, a first cylinder chamber 20 and a second cylinder chamber 32 are provided to the primary pulley 16 and the secondary pulley 26, respectively. Line pressure is continuously supplied to the second cylinder chamber 32 of the secondary pulley 26. Hydraulic pressure, which is acquired by regulating the line pressure as original pressure with a shift control valve 63, is supplied to the first cylinder chamber 20 of the primary pulley 16. The hydraulic pressure supplied to the first cylinder chamber 20 changes the groove width of the primary pulley 16 to change the gear ratio. In the meantime, the line pressure is changed within a predetermined range to control a thrust (pushing pressure) against a V-belt 24.

To control the hydraulic pressure supplied to the first cylinder chamber 20, the shift control valve 63 driven by a step motor 64 regulates the line pressure as the original pressure.

More specifically, the shift control valve 63 has a primary port 63P connected with the first cylinder chamber 20, a line pressure port 63L supplied with the line pressure, and a drain port 63T. The shift control valve 63 also has a spool 63a, which slides according to the positions of a moving conical board 22 of the primary pulley 16 and the step motor 64. The displacement of the spool 63a causes the primary port 63P to selectively connect with the line pressure port 63L or the drain port 63T to thereby control the hydraulic pressure supplied to the first cylinder chamber 20.

Oil supplied to the primary pulley 16 is supplied as control hydraulic pressure to the first cylinder chamber 20, and is also supplied to a bearing 14 of the primary pulley 16 through an orifice in order to lubricate the bearing 14.

The continuously variable transmission of this kind is disclosed in, e.g., Japanese Patent Application Laid-Open Publication No. 11-82725.

The hybrid vehicle is equipped with a battery having a large capacity, and it is therefore easy to use the electric motor in various areas of a power system. For this reason, the electric motor preferably drives a hydraulic pump for use in lubricating each part of the engine and operating the continuously variable transmission because this achieves the stable rotation of the pump.

If the electric motor drives the hydraulic pump, however, the hydraulic pump stops functioning and supplying the line pressure when a failure occurs in a power supply system of the electric motor while the vehicle is running.

In this case, an alarm or the like is given to warn of the failure, and the vehicle is stopped to restore the system to a normal operating state. If the vehicle is driven again, however, the shift may not be performed normally.

According to a research, the above problem results from a slip between the variable pulleys and the V-belt.

It is therefore an object of the present invention to provide a continuously variable transmission, which prevents the slip between the variable pulleys and the V-belt even when the supply of the hydraulic pressure is temporarily stopped due to the failure in the power supply system of the electric motor that drives the hydraulic pump.

According to a further research about the slip, if the hydraulic pump stops to cease the supply of the line pressure, the step motor is controlled toward a Lo range (low range gear ratio) with the deceleration of the vehicle. Since the residual hydraulic pressure gradually gets out of a hydraulic circuit, the hydraulic pressure in the second cylinder chamber 32 of the secondary pulley is lowered. Consequently, the vehicle stops while the step motor cannot return to the position corresponding to the lowest gear ratio.

As time passes, the hydraulic pressure in the first cylinder chamber 20 of the primary pulley is further lowered. Moreover, if the oil is also supplied to the bearing 14, the hydraulic pressure leaks. Consequently, the oil is decreased in the first cylinder chamber 20.

Therefore, when the vehicle restarts running after the power supply system of the electric motor is restored to a normal operating state following the failure, the shift cannot be started from the lowest range ratio and there is hardly remained the pushing pressure of the pulleys against the V-belt. In addition, the shift is started with only a small amount of hydraulic pressure being supplied. This results in the slip between the pulleys and the V-belt.

SUMMARY OF THE INVENTION

To solve the above-mentioned problems, the present invention provides a control device of a continuously variable transmission which comprises: a transmission mechanism comprising a pair of variable pulleys with groove widths being changed by supply of hydraulic pressure, and a belt passing about the pair of variable pulleys; a hydraulic pump being driven by an electric motor to supply hydraulic pressure; line pressure control means for regulating hydraulic pressure from the hydraulic pump to predetermined line pressure; shift control means for outputting a shift command according to a driving state; and a shift control valve for supplying hydraulic pressure, whose original pressure is line pressure, to the pair of variable pulleys in the transmission mechanism according to the shift command; the control device of the continuously variable transmission further comprising: failure information holding means for holding failure information on a failure of the electric motor; and wherein if, at start of driving, the failure information holding means holds failure information indicating that the electric motor fails in previous driving, the shift control means outputs a predetermined shift command to thereby fill the variable pulleys with hydraulic pressure through the shift control valve.

If the electric motor fails in the previous driving of the vehicle, the variable pulleys are filled with the hydraulic pressure through the shift control valve. Accordingly, if no hydraulic pressure remains in the variable pulleys and it is therefore necessary to prevent the slip, the shift control valve is controlled to fill the variable pulleys with the hydraulic pressure to prevent the slip between the pulleys and the belt.

The present invention also provides a control device of a continuously variable transmission, which comprises: a transmission mechanism comprising a primary pulley and a secondary pulley provided with a first cylinder chamber and a second cylinder chamber, with groove widths being changed by supply of hydraulic pressure respectively, and a belt passing about the primary pulley and the secondary pulley; a hydraulic pump being driven by an electric motor to supply hydraulic pressure; line pressure control means for regulating hydraulic pressure from the hydraulic pump to predetermined line pressure and continuously supplying the line pressure to the second cylinder chamber; a shift control valve being driven by an actuator to supply hydraulic pressure, whose original pressure is line pressure, to the first cylinder chamber; and shift control means for outputting a shift command for controlling the actuator according to a driving state, the control device of the continuously variable transmission further comprising: failure information holding means for holding failure information on the failure of the electric motor; and wherein if, at start of driving, the failure information holding means holds failure information indicating that the electric motor fails in previous driving, the shift control means outputs a shift command targeting a high range ratio to thereby fill the first cylinder chamber of the primary pulley with hydraulic pressure.

The shift control valve is controlled to fill the first cylinder chamber with the hydraulic pressure according to the shift command targeting the high range ratio. This reduces the groove width of the primary pulley, and eliminates a clearance between the primary and secondary pulleys and the belt, thus preventing the slip.

In one preferred form of the present invention, the first cylinder chamber is filled with hydraulic pressure by holding a shift command targeting a high range ratio for a predetermined period of time.

The predetermined period of time is found in advance by conducting an experiment, and the shift command is held for the predetermined period of time. Therefore, the first cylinder chamber can be filled with the hydraulic pressure without fail.

The present invention also provides a control device of a continuously variable transmission in a vehicle, which control device comprises: a transmission mechanism comprising a primary pulley and a secondary pulley provided with a first cylinder chamber and a second cylinder chamber, respectively, and a belt passing about the primary pulley and the secondary pulley with groove widths being changed by supply of hydraulic pressure; a hydraulic pump being driven by an electric motor to supply hydraulic pressure; line pressure control means for regulating hydraulic pressure from the hydraulic pump to predetermined line pressure and continuously supplying the line pressure to the second cylinder chamber; a shift control valve being driven by an actuator to supply hydraulic pressure, whose original pressure is line pressure, to the first cylinder chamber; and shift control means for outputting a shift command for controlling the actuator according to a driving state, the control device of the continuously variable transmission comprising: failure information holding means for holding failure information concerning a failure of the electric motor; and wherein if, at start of driving, the failure information holding means holds failure information indicating that the electric motor fails in previous driving, the shift control means outputs a shift command targeting a high range ratio for a predetermined period of time before the start of driving to thereby fill the first cylinder chamber of the primary pulley with hydraulic pressure, and start outputting a shift command targeting a normal gear ratio according to the driving state after a predetermined vehicle speed is reached after the start of driving.

As mentioned above, the control for preventing the slip transits to the normal shift control after the predetermined vehicle speed, which enables the stable detection of the input/output revolutions, etc., is reached. This eliminates the possibility of instability during the transition from the control for preventing the slip to the normal shift control.

In another preferred form of the present invention, a motor control unit controls the electric motor; the failure information holding means is an internal memory of the shift control means, which retains a heavy-current system fail flag according to the failure information received from the motor control unit; and the heavy-current system fail flag is reset after the predetermined vehicle speed is reached.

As mentioned above, the shift control means holds the failure information concerning the failure in the previous driving of the vehicle, and it is therefore possible to quickly execute the control for preventing the slip without waiting for a command or the like from other control unit. It is also possible to prevent the unnecessary repetition of the control for preventing the slip when the vehicle is driven next time, because the heavy-current system fail flag representing the failure information is reset after the execution of the control for preventing the slip.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment of the present invention will be described hereinbelow.

Figure 1:
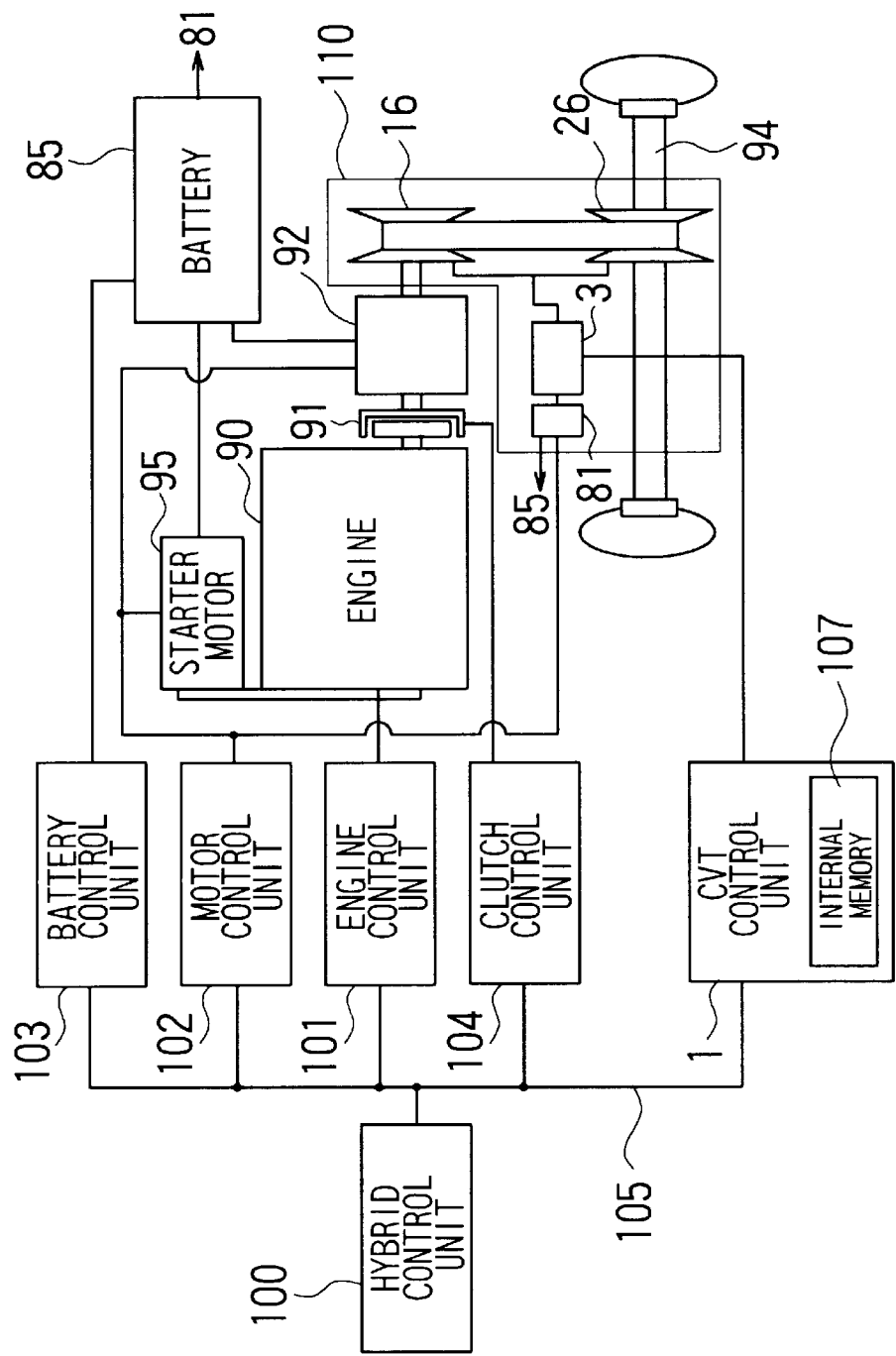
FIG. 1 is a schematic diagram showing a system of a hybrid vehicle.

FIG. 1 is a schematic diagram showing a system of a hybrid vehicle equipped with a V-belt type continuously variable transmission according to an embodiment.

An output shaft of an engine 90 is connected to one end of a rotor of a main motor 92 through an electromagnetic clutch 91. A transmission mechanism 10, which is comprised of variable pulleys (a primary pulley 16 and a secondary pulley 26) and a V-belt 24, is provided between the other end of the rotor of the main motor 92 and an axle 94.

The transmission mechanism 10 connects to a hydraulic control valve 3, which is controlled by a CVT control unit (CVTCU) 1. The hydraulic control valve 3 is supplied with hydraulic pressure from a hydraulic pump 80, which is driven by an electric motor 81. A starter motor 95 is attached to the engine 90.

The main motor 92, the starter motor 95 and the electric motor 81 are connected to a battery 85 that is a power source therefor.

An engine control unit (ECU) 101 controls the engine 90; a motor control unit (MCU) 102 controls the main motor 92, the starter motor 95 and the electric motor 81; a battery control unit (BCU) 103 controls the battery 85; and a clutch control unit (CCU) 104 controls the electromagnetic clutch 91. These control units as well as the CVT control unit 1 are connected to a hybrid control unit 100 through a control network 105 so that they can be controlled integrally.

The motor control unit 102 runs the main motor 92 and the electric motor 81 through an inverter (not shown) by controlling a PWM.

The main motor 92 and the starter motor 95 generate power and supply regeneration energy to the battery 85 under some control conditions while the vehicle is running.

With the above arrangement, if the electromagnetic clutch 91 is shut off e.g., at the start of the vehicle in order to cause the main motor 92 to drive the vehicle, the vehicle can start smoothly without exhausting unburned gas. If high power needs to be outputted, the electromagnetic clutch 91 is engaged in order to cause the engine 90 as well as the main motor 92 to drive the vehicle or to acquire the regeneration energy from the main motor 92 while the engine 90 is driving the vehicle.

If a failure occurs in driving systems of the main motor 92 and the electric motor 81 for the hydraulic pump 80 while the vehicle is running, the motor control unit 102 transmits a heavy-current system fail signal to the CVT control unit 1. In response to this signal, the CVT control unit 1 sets a heavy-current system fail flag. The flag is stored and held in an internal memory as a failure information holding means even if the power supply of the CVT control unit 1 is shut off.

The heavy-current system fail signal may be replaced by a relay cut signal that is outputted from the motor control unit 102 to the hybrid control unit 100 when a failure occurs, or a PWM stop signal that is outputted to the electric motor 81 in the motor control unit 102.

Figure 2:
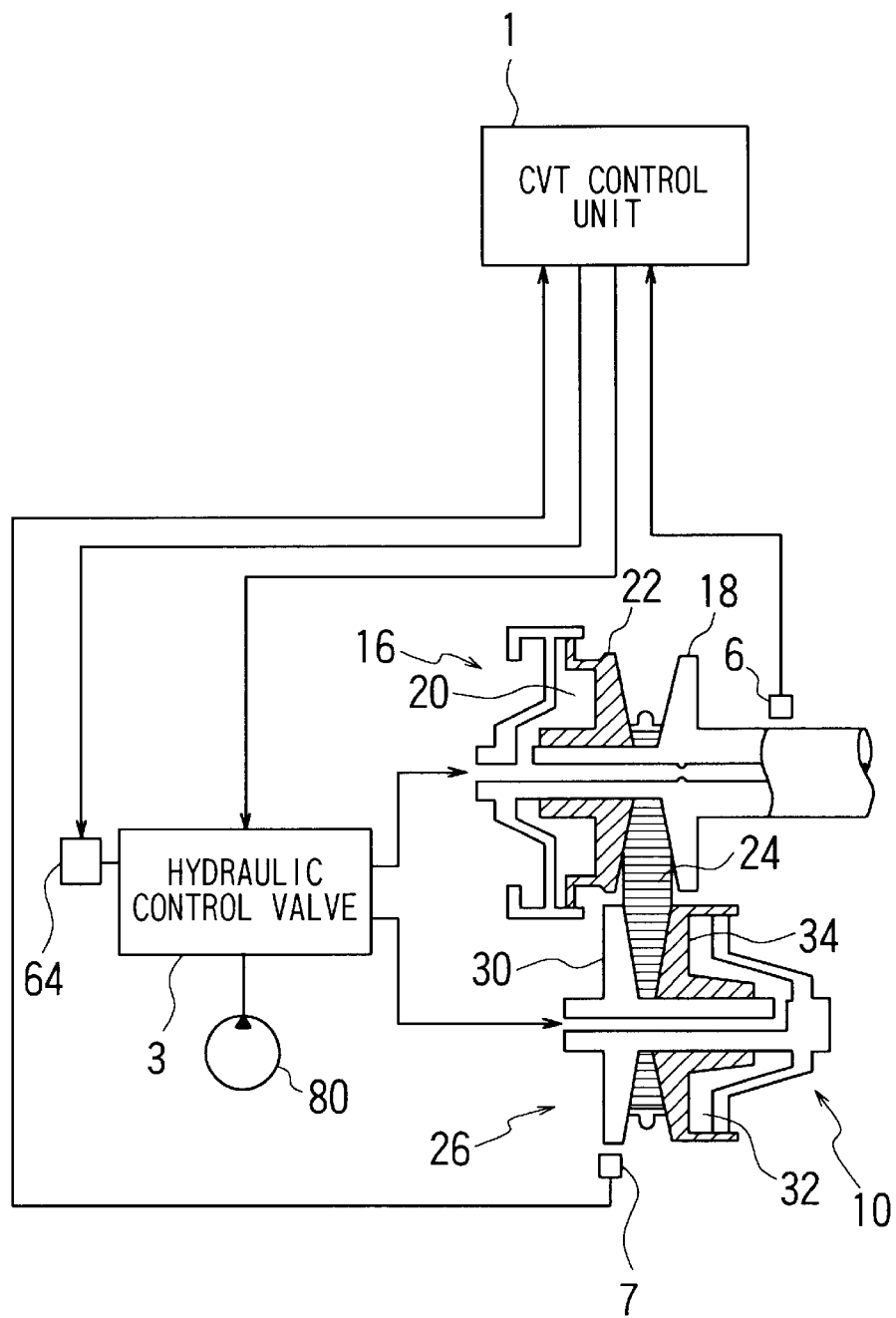
FIG. 2 is a schematic block diagram showing a continuously variable transmission according to an embodiment.
Figure 3:
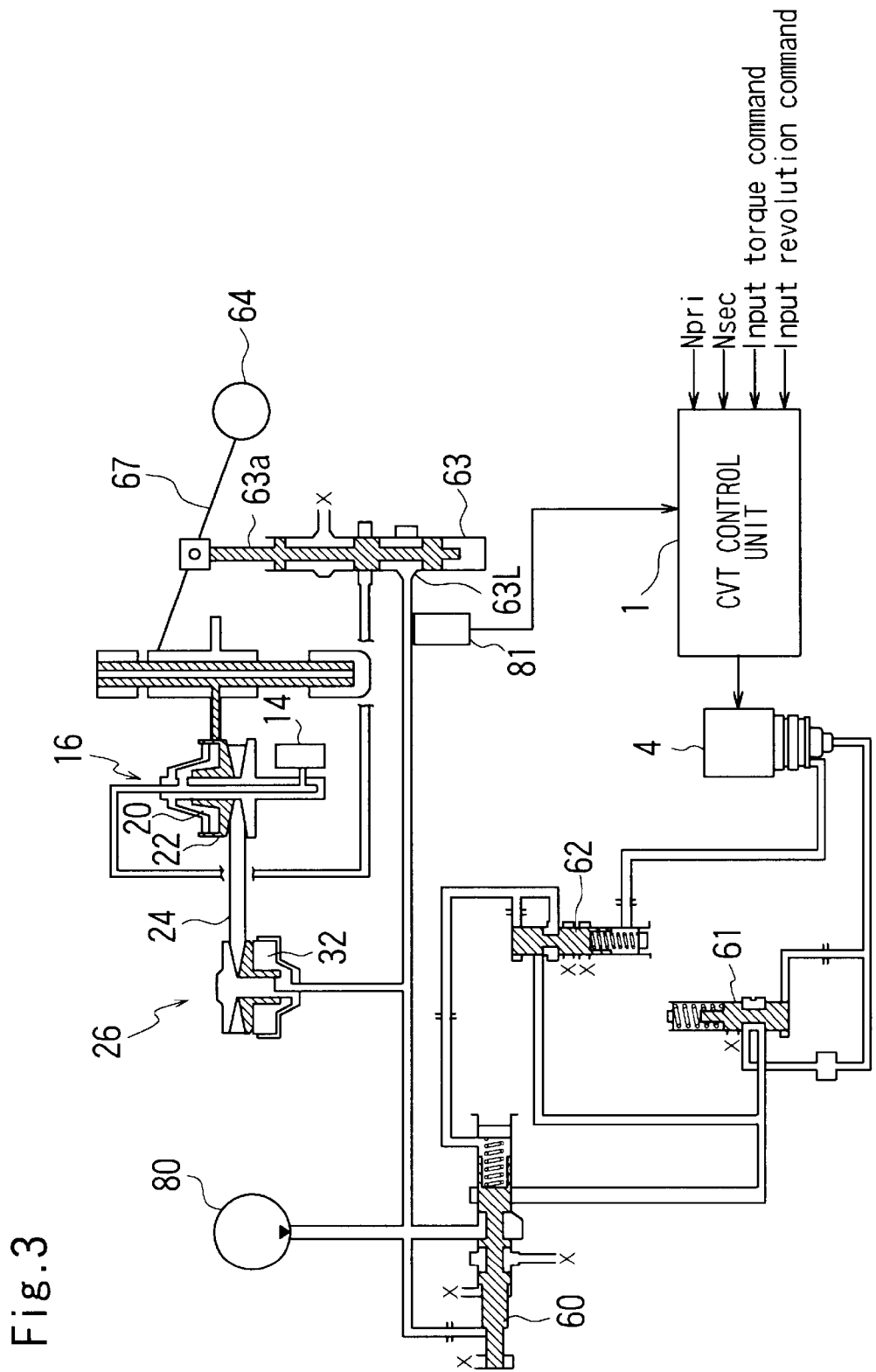
FIG. 3 is a diagram showing a hydraulic control circuit of the continuously variable transmission.

FIG. 2 is a schematic block diagram showing the continuously variable transmission, and FIG. 3 shows a hydraulic control circuit thereof.

The transmission mechanism 10 is constructed in such a manner that the V-belt 24 passes about the primary pulley 16 and the secondary pulley 26. On the primary pulley 16, a V-shaped groove is formed by a fixed conical board 18 rotating integrally with the rotor of the main motor and a moving conical board 22 opposite to the fixed conical board 22. The primary pulley 16 is provided with a first cylinder chamber 20, which applies the hydraulic pressure to the back surface of the moving conical board 22 to axially displace it.

On the secondary pulley 26, a V-shaped pulley groove is formed by a fixed conical board 30 rotating integrally with an output shaft for the axle and a moving conical board 34 opposite to the fixed conical board 30. A return spring, not shown, presses the movable conical board 34 in such a direction as to reduce the width of the pulley groove. The secondary pulley 26 is provided with a second cylinder chamber 32, which applies the hydraulic pressure to the back surface of the moving conical board 34 to axially displace it.

The hydraulic control valve 3 controls the transmission mechanism 10 according to a signal from the CVT control unit 1.

The second cylinder chamber 32 is continuously supplied with the line pressure from the hydraulic control valve 3. The hydraulic control valve 3 has a shift control valve 63 that supplies the hydraulic pressure, which is acquired by regulating the line pressure as the original pressure, to the first cylinder chamber 20.

A pressure receiving net area of the first cylinder chamber 20 is predetermined as being larger than that of the second cylinder chamber 32.

The hydraulic pressure applied to the first cylinder chamber 20 is controlled by the shift control valve 63 to thereby change the groove width of the primary pulley 16, and the line pressure is supplied to the second cylinder chamber 32 to control the pushing pressure against the V-belt 24, to thereby achieve a shift. Thus, driving force is transmitted according to contact frictional force of the V-belt 24 and the pulleys 16, 26.

From the standpoint of the revolutions, if the groove width of the primary pulley 16 is increased to achieve a low pulley ratio at which the contact radius of the V-belt 24 is small and the contact radius of the secondary pulley 26 is large, the gear ratio is raised to transmit reduced revolutions of the engine to the axle. On the other hand, the gear ratio is lowered at a high pulley ratio reverse to the above-mentioned low pulley ratio. In the meantime, the gear ratio is continuously changed according to the contact radius ratio of the primary pulley 16 to the secondary pulley 26.

The second cylinder chamber 32 is continuously supplied with the line pressure, which is acquired by regulating the hydraulic pressure from the hydraulic pump with a line pressure regulator 60, through the hydraulic control valve 3 as stated above. The line pressure is also supplied to the shift control valve 63 of the hydraulic control vale 3. To control the hydraulic pressure supplied to the first cylinder chamber 20, the shift control valve 63 driven by the step motor 64 regulates the line pressure as the original pressure.

The hydraulic control valve 3 also has a line pressure solenoid 4, a pressure modifier 62 and a pilot valve 61.

The CVT control unit 1 finds necessary line pressure according to an input torque command and an input revolution command from the hybrid control unit. The CVT control unit 1 then outputs a corresponding duty ratio signal as a hydraulic pressure command to the line pressure solenoid 4 and outputs a shift command to the step motor 64.

The step motor 64 is constructed in such a manner as to output a linear displacement. For example, the positions of 20–170 steps are selected within the range of 200 steps according to a target gear ratio.

The line pressure solenoid 4 supplies the hydraulic pressure from the pilot valve 61 to the pressure modifier 62 according to the duty ratio signal from the CVT control unit 1. The line pressure regulator 60 sets the hydraulic pressure from the hydraulic pump 80 at line pressure corresponding to the hydraulic pressure outputted from the pressure modifier 62. The line pressure is changed within a predetermined range according to necessary transmission driving force and is then outputted.

According to the present embodiment, the CVT control unit 1 constitutes the shift control means. The line pressure solenoid 4, the pressure modifier 62, the pilot valve 61 and the line pressure regulator 60 constitute the line pressure control means.

A spool 63a of the shift control valve 63 is driven according to the displacement of a shift link 67 extending between the moving conical board 22 of the primary pulley 16 and the step motor 64. This causes the shift control valve 63 to adjust the line pressure from the line pressure regulator 60 and supply the adjusted line pressure to the first cylinder chamber 20. If the groove width has reached a value corresponding to the position of the step motor 64, the supply of the hydraulic pressure to the first cylinder chamber 20 is stopped by the displacement of the shift link 67 operating in coordination with the moving conical board 22. This variably controls the groove width of the primary pulley 16 and achieves a desired gear ratio.

Figure 5:
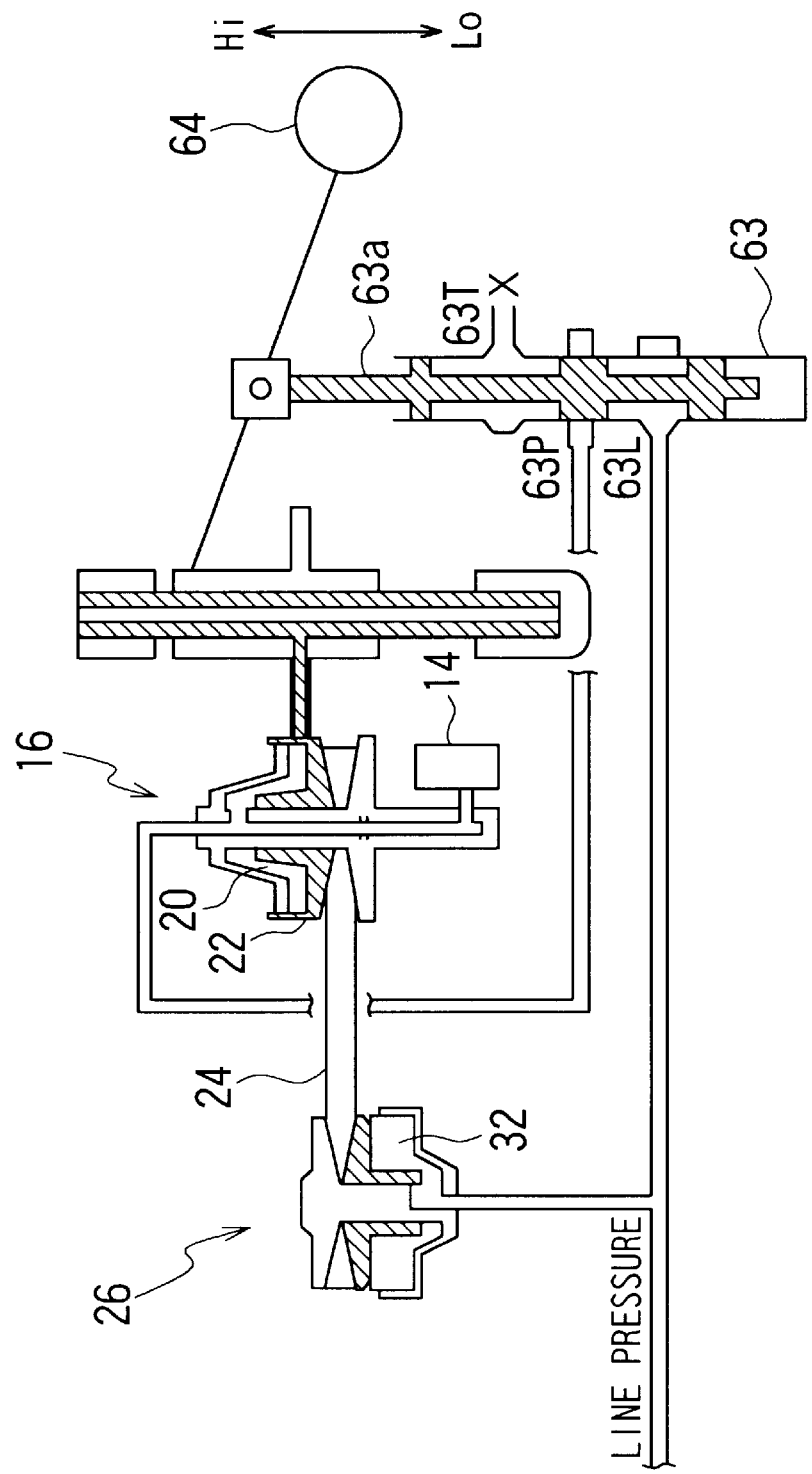
FIG. 5 is a diagram showing the connection between variable pulleys and a shift control valve.

The structure of the shift control valve 63 is the same as shown in FIG. 5.

The CVT control unit 1 connects to a first revolution sensor 6 and a second revolution sensor 7 for detecting the input/output revolutions Npri and Nsec of the primary pulley 16 and the secondary pulley 26, respectively. An actual gear ratio at the transmission mechanism 10 is obtained according to sensor signals transmitted from those sensors.

To activate the continuously variable transmission, the CVT control unit 1 performs the shift control correspondingly to whether the heavy-current system fail flag is set or not.

Figure 4:
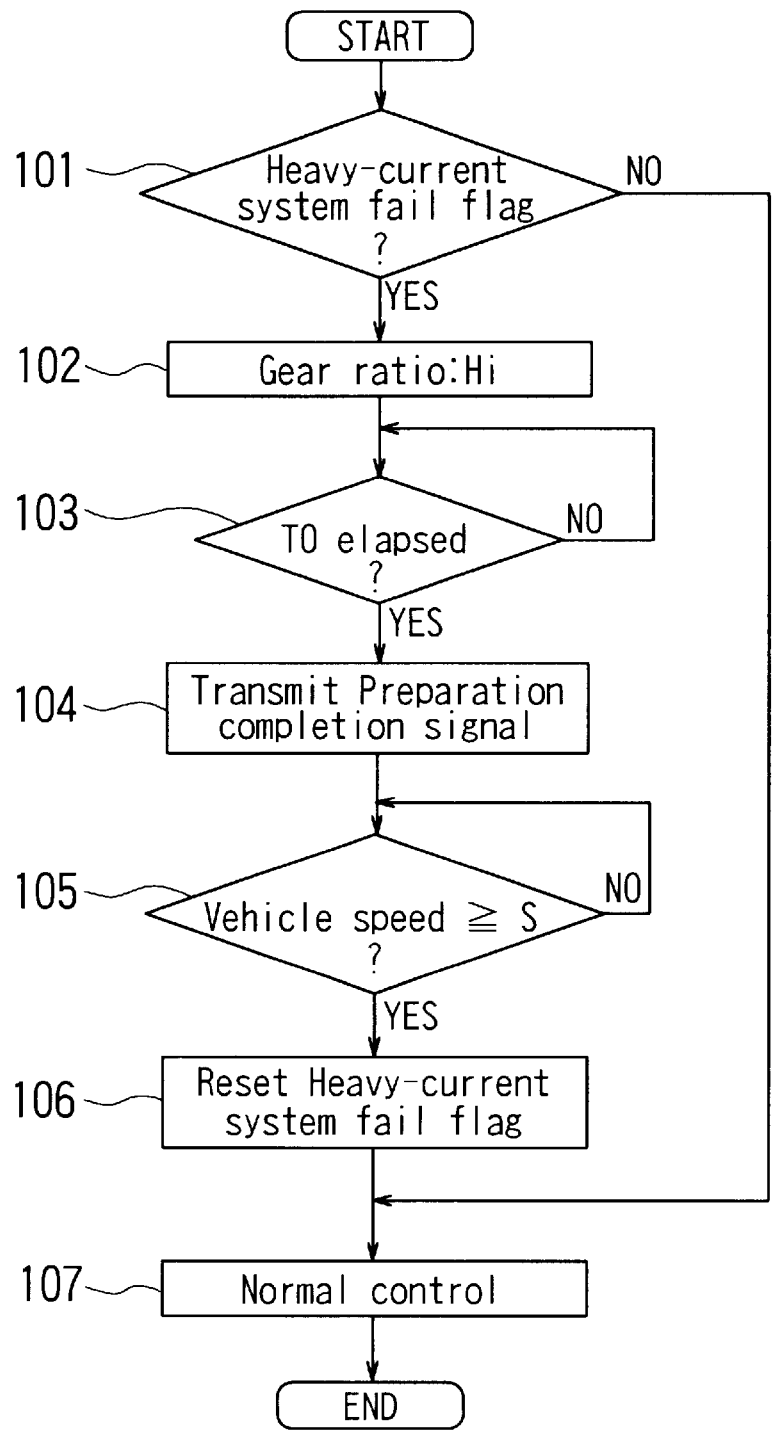
FIG. 4 is a flow chart showing the flow of control when the continuously variable transmission of the embodiment is activated.

FIG. 4 is a flowchart showing the flow of the shift control when the continuously variable transmission is activated.

When an ignition switch is turned on to restart driving the vehicle, the CVT control unit 1 determines whether the heavy-current system fail flag is set or not in a step 101.

If the heavy-current system fail flag is set, the CVT control unit 1 sets a target gear ratio in a high range, more preferably, at a gear ratio 1, and runs the step motor 64 in a step 102.

In a step 103, the CVT control unit 1 determines whether the elapsed time from the turn on of the ignition switch has reached a preset time T0 or not. The gear ratio 1 is maintained until the preset time T0 passes.

The time T0 is set at about five seconds, which are required to fill the first cylinder chamber 20 of the primary pulley 16 with the oil. At a low temperature, the time T0 is set at a longer time because the viscosity varies according to the temperature.

If the time T0 has passed, the process goes to a step 104 wherein the CVT control unit 1 transmits a preparation completion signal to the hybrid control unit 100.

In response to the preparation completion signal, the hybrid control unit 100 transmits a start permission signal to the engine control unit 101, the motor control unit 102 and the clutch control unit 104 to enable the vehicle to run.

In a next step 105, it is determined whether a speed of a vehicle having started running has reached a predetermined value S or not. The predetermined value S is determined in such a manner as to enable the first and second revolution sensor 6 and 7 to stably detect the revolutions. For example, the predetermined value S is set at 5 km/h. If the vehicle speed has reached the predetermined value S, the process goes to a step 106 to reset the heavy-current system fail flag. In a next step 107, the position (the number of steps) of the step motor 64 maintaining the gear ratio 1 is canceled so as to start the normal shift control in accordance with the input torque command and the input revolution command from the hybrid control unit 100.

If it is determined in the step 101 that the heavy-current system fail flag is not set, the process directly goes to the step 107 to start the normal shift control beginning in the Lo range.

As explained above, if the heavy-current system fail flag, which indicates that the power supply system of the electric motor 81 of the hydraulic pump 80 fails in the previous driving, is set at the start of driving; the shift control valve 63 is opened by fixing the gear ratio at 1 for a while. Then, the first cylinder chamber 20 of the primary pulley 16, which may be empty, is filled with the hydraulic pressure. After that, the vehicle is permitted to start and the pulley is allowed to rotate. This ensures the pushing pressure against the V-belt 24 and prevents the slip between the pulleys and the V-belt.

After the start of the vehicle, the gear ratio is maintained at 1 until the vehicle speed reaches the predetermined value S, which enables the stable detection of the revolutions. This eliminates the possibility of instability during the transition to the normal shift control.

In the above description of the embodiment, the present invention is applied to the V-belt type continuously variable transmission for use in the hybrid vehicle, but the present invention should not be restricted to this. The present invention may also be applied to a continuously variable transmission with variable pulleys, which are supplied with hydraulic pressure from a hydraulic pump driven by an electric motor, for use in various types of vehicles.

As set forth hereinabove, the present invention provides the control device of the continuously variable transmission which comprises: the transmission mechanism comprising the pair of variable pulleys with groove widths being changed by supply of hydraulic pressure, and the belt passing about the pair of variable pulleys; and the hydraulic pump being driven by the electric motor to supply hydraulic pressure, the control device of the continuously variable transmission comprising: failure information holding means for holding failure information on a failure of the electric motor; and wherein if, at the start of driving, the failure information holding means holds failure information indicating that the electric motor fails in previous driving, the shift control means outputs the predetermined shift command to thereby fill the variable pulleys with hydraulic pressure through the shift control valve. Therefore, if no hydraulic pressure remains in the variable pulleys due to the failure of the electric motor, the shift control valve is controlled to fill the variable pulleys with the hydraulic pressure in order to prevent the slip between the pulleys and the belt. If the failure information holding means holds no failure information, the vehicle can be started under the normal shift control from the beginning.

According to another aspect of the present invention, the control device of the continuously variable transmission, in which the transmission mechanism comprises the primary pulley and the secondary pulley provided with the first cylinder chamber and the second cylinder chamber, respectively, and the belt passing about the primary pulley and the secondary pulley with groove widths being changed by supply of the hydraulic pressure, and the shift control valve is driven by an actuator to supply hydraulic pressure, whose original pressure is line pressure, to the first cylinder chamber, is characterized in that: if, at the start of driving, the failure information holding means holds failure information indicating that the electric motor fails in previous driving, the shift control means outputs the shift command targeting the high range ratio to thereby fill the first cylinder chamber of the primary pulley with hydraulic pressure. Since the shift control valve is controlled to fill the first cylinder chamber with the hydraulic pressure according to the shift command targeting the high range ratio, the groove width of the primary pulley is reduced to eliminate a clearance between the primary and secondary pulleys and the belt, thus preventing the slip.

Moreover, the first cylinder chamber can be filled with the hydraulic pressure without fail by holding the shift command targeting a high range ratio for a predetermined period of time.

Furthermore, if the continuously variable transmission is provided in the vehicle, the shift command targeting the high range ratio is outputted for a predetermined period of time before the start of the vehicle. The vehicle is started after the first cylinder chamber of the primary pulley is filled with the hydraulic pressure. The output of a shift command targeting a normal gear ratio according to the driving state is started after a predetermined vehicle speed is reached. This eliminates the possibility of instability during the transition from the control for preventing the slip to the normal shift control.

In addition, if the motor control unit controls the electric motor, the failure information inputted from the motor control unit is stored as the heavy-current system fail flag in the internal memory of the shift control means and is reset after the predetermined vehicle speed is reached. This enables the quick execution of the control for preventing the slip without waiting for a command or the like from other control unit, and prevents the unnecessary repetition of the control for preventing the slip until the vehicle is driven next time.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A control device of a continuously variable transmission in a vehicle, which control device comprises: a transmission mechanism comprising a primary pulley and a secondary pulley provided with a first cylinder chamber and a second cylinder chamber, with groove widths being changed by supply of hydraulic pressure respectively, and a belt provided between said primary pulley and said secondary pulley; a hydraulic pump being driven by an electric motor to supply hydraulic pressure; line pressure control means for regulating hydraulic pressure from said hydraulic pump to predetermined line pressure and continuously supplying said line pressure to said second cylinder chamber; a shift control valve being driven by an actuator to supply hydraulic pressure, whose original pressure is line pressure, to said first cylinder chamber; and shift control means for outputting a shift command for controlling said actuator according to a driving state, said control device of the continuously variable transmission comprising:

failure information holding means for holding failure information concerning a failure of said electric motor; and wherein if, at start of driving, said failure information holding means holds failure information indicating that said electric motor failed in previous driving, said shift control means outputs a shift command targeting a high range ratio for a predetermined period of time before the start of driving to thereby fill said first cylinder chamber of said primary pulley with hydraulic pressure, and starts outputting a shift command targeting a normal gear ratio according to the driving state after a predetermined vehicle speed is reached after the start of driving.

2. A control device of a continuously variable transmission according to claim 1, wherein:

a motor control unit controls said electric motor;

said failure information holding means is an internal memory of said shift control means, said internal memory retaining a heavy-current system fail flag according to the failure information inputted from said motor control unit;

and said heavy-current system fail flag is reset after said predetermined vehicle speed is reached.

* * * * *